United States Patent [19]

Yamamura

[11] Patent Number: 5,066,879

[45] Date of Patent: Nov. 19, 1991

[54] SINGLE POWER SOURCE MAGNETIC BEARING DEVICE

[75] Inventor: Akira Yamamura, Tokyo, Japan

[73] Assignee: Nippon Ferrofluidics Corporation, Tokyo, Japan

[21] Appl. No.: 515,951

[22] Filed: Apr. 27, 1990

[51] Int. Cl.[5] .......................... H02K 7/09; G05F 1/08; F16C 32/04

[52] U.S. Cl. .................................. 310/90.5; 310/68 B; 318/293

[58] Field of Search ............................ 310/90.5, 68 B; 318/293

[56] References Cited

U.S. PATENT DOCUMENTS

| | | | |
|---|---|---|---|
| 4,481,452 | 11/1984 | Kitano et al. | 318/293 |
| 4,649,326 | 3/1987 | Mansmann et al. | 318/293 |

FOREIGN PATENT DOCUMENTS

| | | | |
|---|---|---|---|
| 57-65416 | 4/1982 | Japan | 310/90.5 |
| 269722 | 10/1989 | Japan | 310/90.5 |

*Primary Examiner*—William H. Beha, Jr.
*Assistant Examiner*—D. L. Rebsch
*Attorney, Agent, or Firm*—Armstrong, Nikaido, Marmelstein, Kubovcik & Murray

[57] ABSTRACT

A magnetic bearing device that incorporates a magnetic movable member, a first supporting member having a first coil and a permanent magnet, a second supporting member having a second coil and a permanent magnet, state detecting means for detecting the displacement of the movable member, a first and second wirings for applying current, and switches connected to the first and second wirings for switching the direction of current applied to the first and second coils. The first and second supporting members are located so as to position the movable member between them. During operation, the movable member is magnetically supported so as not to be in contact with either of the supporting members. The first wiring has a first switch circuit connected to a first drive circuit, wherein the bottom end of the first coil is connected between the first switch circuit and the first drive circuit. The first and second wirings are connected in parallel between a dc power source and ground. The second wiring has a second switch circuit connected to a second drive circuit, and the bottom end of the second coil is connected between the second switch circuit and the second drive circuit. The switches operate by switching to either a simultaneous closing state of the first switch circuit and the second drive circuit or a simultaneous closing state of the second switch circuit and the first drive circuit according to the state detecting means.

1 Claim, 3 Drawing Sheets

43
POSITIVE POLARITY
POWER SOURCE
CONTROL
CIRCUIT
46
45
STATE DETECTING
CIRCUIT
7
14
42
41
44
NEGATIVE POLARITY
POWER SOURCE

SINGLE POWER SOURCE MAGNETIC BEARING DEVICE

BACKGROUND OF THE INVENTION

1. Industrial Field

This invention relates to a magnetic bearing device.

2. Prior Art

First, specific construction of a magnetic bearing device is generally described hereinafter with reference to FIG. 2 showing an embodiment of this invention. In the drawing, numeral 1 indicates a movable member of a soft magnetic substance, and numerals 2, 3 indicate first and second supporting members respectively disposed on opposite sides, putting the movable member 1 therebetween. Permanent magnets 4, 11 are respectively disposed in the first and second supporting members so that magnetic attractive force generated in the permanent magnets 4, 11 acts on the movable member 1 from both sides. Further, coils 7, 14 are respectively disposed in the supporting members, and the mentioned magnetic attractive force is increased or decreased by applying electric current to the coils 7, 14 so that magnetic flux is generated in the same direction as the magnetic flux of the permanent magnets 4, 11, otherwise in the reverse direction. To hold the movable member 1 at a reference position between the supporting members 2, 3 in such a manner as not to contact the supporting members, application of current to the coils 7, 14 is controlled so as to increase magnetic attractive force in the reverse direction of the displacement or decrease the force in the same direction as the displacement when the movable member 1 deviates from the reference position.

It may be also possible that the application of current to each coil 7, 14 is so arranged as to be separately controlled, in which case current is applied to only one of the coils while applying no current to the remaining coil. In such an arrangement, however, nonlinearity of unstable spring constant becomes extremely large with respect to positional relation between the movable member 1 and each of the supporting members 2, 3, and it is difficult to obtain sufficiently stable controllability. It is, therefore, conventional to adopt an arrangement in which both coils 7, 14 are connected in series to apply current simultaneously to the coils, so that magnetic flux in one coil is in the same direction as magnetic flux of one permanent magnet, while magnetic flux in the other coil is in the reverse direction of magnetic flux of the other permanent magnet. That is, control for holding the movable member 1 stably at the reference position is carried out by simultaneously increasing magnetic attractive force from a supporting member located in the reverse direction of displacement of the movable member 1 and decreasing magnetic attractive force from a supporting member located in the same direction as the displacement.

FIG. 3 shows a circuit diagram of the above-mentioned arrangement for controlling current applied to both coils 7, 14, and in which numeral 41 indicates a drive circuit comprising a single-end-push-pull circuit, for example, and the mentioned coils 7, 14 connected in series join between the drive circuit 41 and a ground line 42. Connected to the drive circuit 41 are a positive (straight) polarity power source 43 and a negative polarity power source 44. Thus, in the detection of displacement of the movable member 1 from the reference position by means of a state detector circuit 45, either a current path from the positive polarity power source 43 to the earth line 42 as indicated by the solid line arrow in the drawing or a current path from the ground line 42 to the negative polarity power source 44 as indicated by the broken line in the drawing is alternatively established by means of the control circuit 46 in accordance with direction of displacement, whereby direction of current applied to the coils 7, 14 can be switched in accordance with direction of displacement of the movable member 1.

In the conventional control circuit of above arrangement, however, since the direction of current applied to the coils 7, 14 is switched in accordance with direction of displacement of the movable member 1 from the reference position, two power sources 43, 44 of positive polarity and negative polarity are essential. As a result, a problem exists in that the construction is large-sized, requiring a large manufacturing cost. In particular, when employing some backup battery to cover power supply interruption, at least two batteries are required respectively for the two positive polarity and negative polarity batteries 43, 44, resulting in further large-sized construction with more expensive manufacturing cost.

SUMMARY OF THE INVENTION

This invention was made to solve the above-discussed problem and has an object of providing a magnetic bearing device of small size and reasonable manufacturing cost.

In order to achieve the foregoing object, there is provided in accordance with this invention a magnetic bearing device comprising:

a first supporting member having a first coil and a permanent magnet; a second supporting member having a second coil and a permanent magnet; said first and second supporting members being disposed putting a movable member therebetween; said first and second coils being connected in series to each other; state detecting means for detecting a state of displacement of said movable member; and in which said movable member is supported in such a manner as not to be in contact with each of the supporting members by changing magnetic attractive force acting on the movable member respectively from said first and second supporting members switching direction of current applied to said two coils in accordance with a state detected by said state detecting means;

characterized by further comprising: a first wiring for application of current; a second wiring for application of current; said first and second wirings being connected in parallel to each other between a dc power source and a ground line; a first switch circuit and a first drive circuit both disposed sequentially in this order on said first wiring for application of current; a second switch circuit and a second drive circuit both disposed sequentially in this order on the second wiring for application of current; a connection terminal on opposite side of the second coil in said first coil; said connection terminal being disposed between said first switch circuit and said first drive circuit; a connection terminal on the opposite side of the first coil in the second coil; said connection terminal being disposed between said second switch circuit and said second drive circuit; and switching the means for switching direction of current applied to both coils by switching to either a simultaneous closing state of said first switch circuit and said second drive circuit or a simultaneous closing state of said second switch circuit and said first drive circuit in accordance with a state detected by said state detecting means.

In the magnetic bearing device of the above-described arrangement, the first switch circuit and the second switch circuit are respectively disposed nearer to the dc power source than the first drive circuit and the second drive circuit. For example, when the first switch circuit and the second drive circuit is in simultaneous closing state, a current passes from the dc power source to the ground line through first switch circuit, first coil, second coil and second drive circuit in order. On the other hand, when switching from the mentioned state to the simultaneous closing state of said second switch circuit and the first drive circuit, a current passes from said dc power source to the ground line through the second switch circuit, second coil, first coil and first drive circuit in order, thus current applied to both coils is switched to the opposite direction.

In this manner, in the magnetic bearing device according to this invention, switching the direction of current applied to both coils in accordance with a state detected by the state detecting means can be performed with one dc power source alone. As a result, construction of the device can be small-sized and manufacturing cost thereof is reduced as compared with the conventional construction in which two dc power sources of positive polarity and negative polarity are essential.

Other objects and advantages of this invention will become apparent in the course of the following description with the accompanying drawings.

DESCRIPTION OF THE PREFERRED EMBODIMENT

Figure 1:
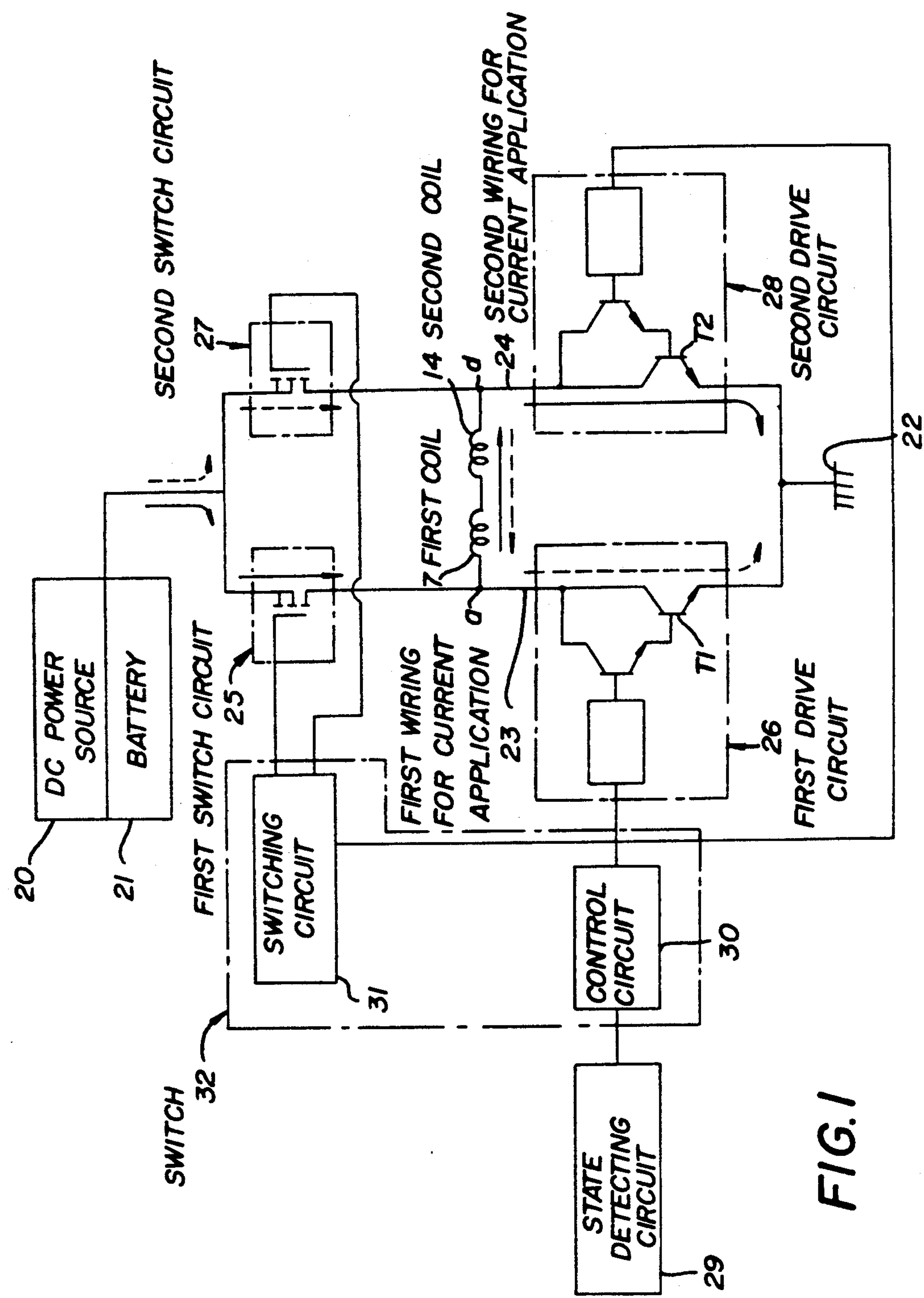
FIG. 1 is a circuit block diagram of a circuit for controlling current applied to the coils in the magnetic bearing device according to an embodiment of the present invention.

An embodiment of the magnetic bearing device according to this invention is now described in detail hereinafter with reference to the accompanying drawings.

First, specific construction of a magnetic bearing device of this embodiment is described with reference to FIG. 2. In the drawing, numeral 1 indicates a movable member of soft magnetic substance, with first and second supporting members 2, 3 respectively disposed on opposite sides, putting the movable member 1 therebetween. Disposed in the first supporting member 2 is a first bearing element which comprises a permanent magnet 4, a N-pole piece 5 attached to the N-pole surface of the permanent magnet 4, a sectionally L-shaped S-pole piece 6 attached to the S-pole surface of the permanent magnet 4 and a first coil 7 wound round the S-pole piece 6. Ends of the respective pole piece 5, 6 are respectively disposed adjacent the movable member 1 at their positions along the left side of the movable member 1 with a vertical distance between the poles 5, 6 as shown in the drawing. In this manner, as indicated by the solid line arrow, a closed loop magnetic path is formed so that magnetic flux generated in the permanent magnet 4 passes from the N-pole piece 5 through the movable member 1 and the S-pole piece 6. Accordingly, a magnetic attractive force in accordance with magnetic flux density in this magnetic path acts from the first supporting member 2 on the movable member 1.

For applying current to the first coil 7, magnetic flux is generated in the magnetic path in accordance with the direction of current applied to the coil, i.e., either in the same direction as magnetic flux of the permanent magnet 4 or in the reverse direction, whereby the mentioned magnetic attractive force is increased or decreased in accordance with a value of the current applied to the first coil 7. In the example shown in the drawing, the first coil 7 is wound round the S-pole piece 6 so that when applying current to the first coil 7 in the direction from one connection terminal "a" toward the other "b", magnetic flux is generated in the reverse direction of magnetic flux of the permanent magnet 4. On the other hand, when applying current to the first coil 7 in the direction from the terminal "b" toward the terminal "a", magnetic flux is generated in the same direction as magnetic flux of the permanent magnet 4.

In the same manner as the foregoing first supporting member 2, a second bearing element 15 is disposed symmetrically with the first bearing element 8, putting the movable member 1 between the two bearing elements in the second supporting member 3. This second bearing element 15 comprises a permanent magnet 11, a N-pole piece 12 attached to the N-pole surface of the permanent magnet 11, a S-pole piece 13 attached to the S-pole surface of the permanent magnet 4 and a second coil 14 wound round the S-pole piece 13. Thus, when applying current to the second coil 14 in the direction from one terminal "c" toward the other "d", magnetic attractive force acting from the second supporting member 3 on the movable member 1 is increased. On the other hand, when applying current to the second coil 14 in the direction from the terminal "d" toward the terminal "c", the mentioned magnetic attractive force is decreased.

The mentioned first and second coils 7, 14 are connected in series by connecting the terminals "b" and "c" so that application of current to both coils 7, 11 may be simultaneously performed. Accordingly, when applying a current in the direction from the terminal "a" to the terminal "d", decrease of the magnetic attractive force acting from the first supporting member 2 on the movable member 1 and increase of the magnetic attractive force acting from the second support member 3 on the movable member 1 are simultaneously performed, whereby a force moving the movable member 1 toward the right in FIG. 2 is generated. On the other hand, when applying a current in the direction from the terminal "d" to the terminal "a", increase of the magnetic attractive force acting from the first supporting member 2 on the movable member 1 and decrease of the magnetic attractive force acting from the second supporting member 3 on the movable member 1 are simultaneously performed, whereby a force moving the movable member 1 toward the left in FIG. 2 is generated.

A state detecting element is further disposed adjacent the mentioned movable member 1, though not illustrated. This state detecting element comprises a sensor coil in which inductance varies in accordance with a distance between the element and the movable member 1, and electrical signal is outputted from the state detecting element in accordance with movement of the movable member 1 to left or right in FIG. 2.

FIG. 1 shows a control block diagram for controlling the application of current to the mentioned coils 7, 14, and in which numeral 20 indicates a dc power source of positive polarity, for example, which is provided with a battery 21 for backup at the time of power interruption. A first wiring 23 for application of current and a second wiring 24 for application of current are connected in parallel between the dc power source and the ground line 22. A first switch circuit 25 comprising a FET (field effect transistor) and a first drive circuit 26 are connected to the first wiring 23 in order from the dc power source 20 side. A second switch circuit 27 and a second drive circuit 28 are connected to the second wiring 24 in order also from the dc power source 20 side. It is also preferred that each of the switch circuits 25, 27 comprises a bipolar transistor or any mechanical switch other than the mentioned FET.

Further, in order to control opening and closing of each switch circuit 25, 27 as well as operation of each drive circuit 26, 28 based on the electrical signal from the mentioned state detecting element, a state detecting circuit (state detecting means) 29, a control circuit 30 and a switching circuit 31 are respectively disposed. In the state detecting circuit 29, an electrical signal from the state detecting element is compared with a reference value established when the movable member 1 is at a reference position, i.e., at a position where the center of the movable member 1 coincides with the center of the space in the left and right directions between the first and second supporting members 2, 3 in FIG. 2. A displacement direction signal (i.e., a signal indicating the direction of displacement) of the movable member 1 is obtained as a result of comparison between the value of the electrical signal and the reference value (i.e., based on whether the electrical signal value is larger or smaller than the reference value), and a displacement amount signal (i.e., a signal indicating an amount of displacement) of the movable member 1 is also obtained in accordance with absolute value of difference from the reference value. These signals are outputted to the control circuit 30. The displacement direction signal is inputted to the switching circuit 31 through the control circuit 30, whereby the mentioned first switch circuit 25 and the second switch circuit 26 are alternatively closed in accordance with the displacement direction signal.

In the meantime, a drive signal in accordance with the displacement amount signal inputted from the state detecting circuit 29 is generated in the control circuit 30, and the drive signal is outputted either to the first drive circuit 26 or the second drive circuit 28 selected in accordance with the displacement direction signal. In this manner, a current path by way of a drive circuit to which the drive signal is inputted is formed. In addition, the switching circuit 31 and the control circuit 30 are interlocked so that the mentioned drive signal may be inputted to the second drive circuit 28 when closing the first switch circuit 25, while the drive signal be inputted to the first drive circuit 26 when closing the second switch circuit 27, as described in detail later. Accordingly, it may be said that switching means 32 is formed by the switching circuit 31 and the control circuit 30.

In the first and second coils 7, 14 connected in series as mentioned above, the terminal "a" is connected to between the first switch circuit 25 and the first drive circuit 26 on the first wiring 23 for current application, and the terminal "d" is connected to between the second switch circuit 27 and the second drive circuit 28 on the second wiring 24 for current application, respectively.

The magnetic bearing device of above arrangement performs the following operation.

Figure 2:
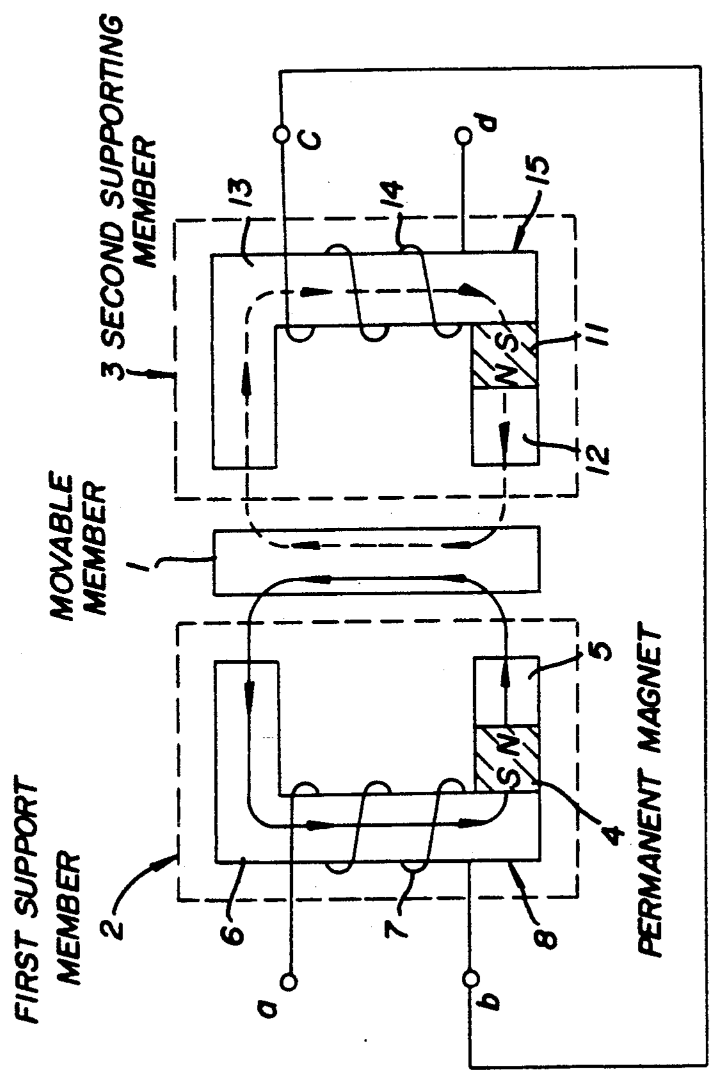
FIG. 2 is a schematic illustration to explain an example of specific arrangement of the magnetic bearing device.
Figure 3:
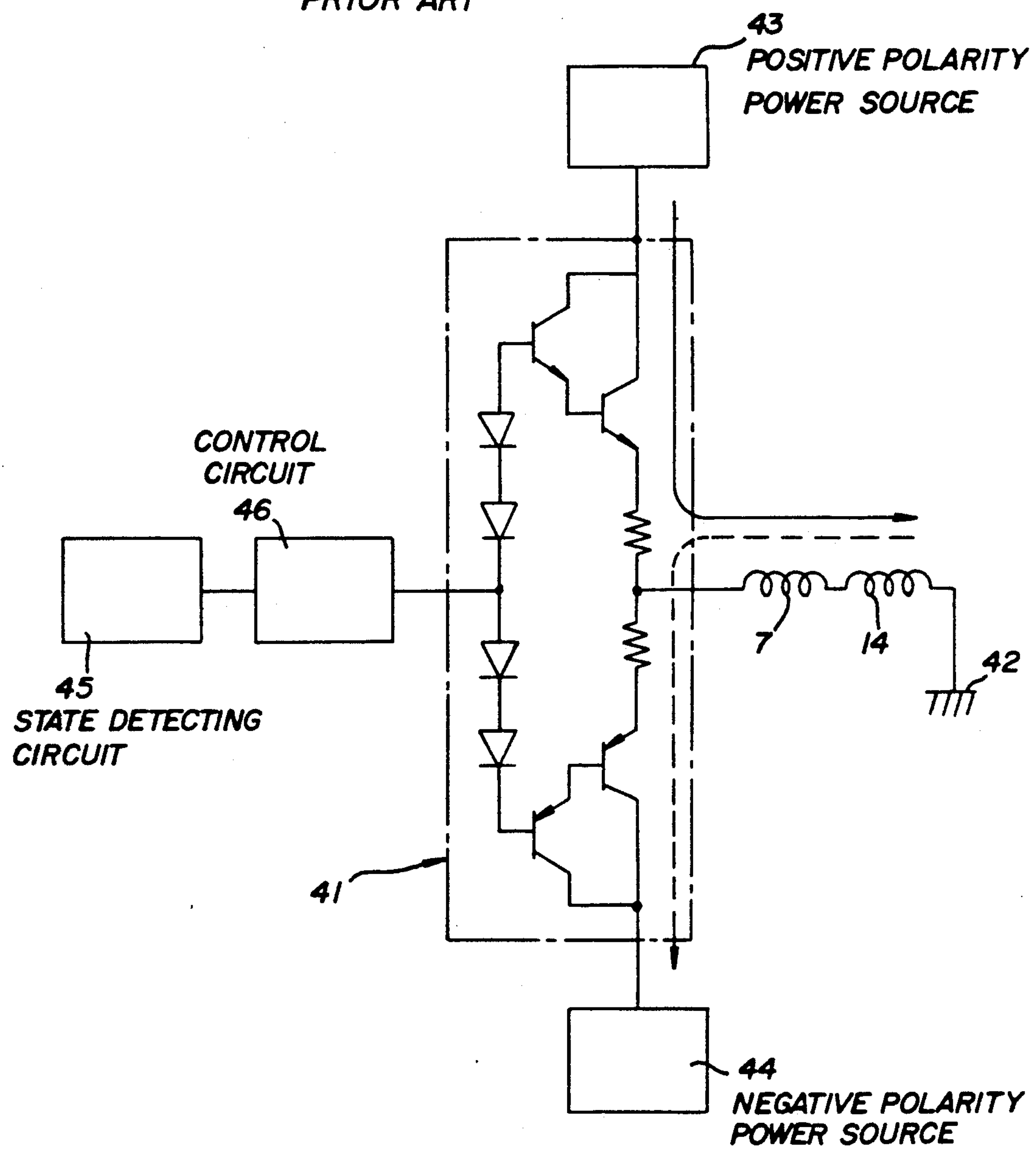
FIG. 3 is a circuit block diagram of a circuit for controlling current applied to the coils in the magnetic bearing device according to the prior art.

Described first is a case wherein movable member 1 has displaced leftwardly in FIG. 2 from a state of being held substantially at the reference position, i.e., from a state wherein each of the magnetic attractive forces from the first and second supporting members 2, 3 onto the movable member 1 is balanced. A leftward displacement signal and a displacement amount signal are inputted from the state detecting circuit 29 to the control circuit 30, and the displacement direction signal is further inputted to the switching circuit 31, whereby the first switch circuit 25 is selected and the closing operation of this first switch circuit 25 is performed by the switching circuit 31. In the meantime, in the control circuit 30, a drive signal in accordance with the mentioned displacement amount signal is generated and, at the same time, the second drive circuit 28 is selected in accordance with the mentioned leftward displacement signal, then the drive signal is inputted to the drive circuit 28, whereby an output transistor T2 in the second drive circuit 28 is ON. As a result of this, as indicated by the solid line arrow in FIG. 1, a current the value of which is in accordance with the drive signal given to the second drive circuit passes from the dc power source 20 to the ground line 22 through first switch circuit 25, first coil 7, second coil 14 and second drive circuit 28. Accordingly, in both coils 7, 14, since the current passes from the terminal "a" side to the terminal "d" side in FIG. 2, decrease of magnetic attractive force acting from the first supporting member 2 on the movable member 1 and increase of magnetic attractive force acting from the second supporting member 3 on the movable member 1 are simultaneously performed, whereby sum of the magnetic attractive forces on the movable member 1 acts rightwardly in FIG. 2. As a result, the movable member 1 displaced to the left is returned to the reference position.

On the other hand, when the movable member 1 has displaced rightwardly from the reference position in FIG. 2, a rightward displacement signal and a displacement amount signal are generated in the state detecting circuit 29, and the second switch circuit 27 is closed by the switching circuit 31. A drive signal in the control circuit 30 is inputted to the first drive circuit 26, whereby an output transistor T1 is ON. As a result of this, as indicated by the broken line arrow in FIG. 1, a current passes from the dc power source 20 to the earth line 22 through second switch circuit 27, second coil 14, first coil 7 and first drive circuit 26.

Accordingly, in both coils 7, 14, since the current passes from the terminal "d" side to the terminal "a" side referring to FIG. 2, increase of magnetic attractive force acting from the first supporting member 2 on the movable member 1 and decrease of magnetic attractive force acting from the second supporting member 3 on the movable member 1 are simultaneously performed, whereby sum of the magnetic attractive force on the movable member 1 acts leftwardly in FIG. 2. As a result, the movable member 1 displaced to the right is returned to the reference position.

In this manner, the movable member 1 is controlled so as to be at the reference position between the first and second supporting members 2, 3 without contacting these supporting members by the steps of detecting direction and amount of displacement, changing direction of current applied to the each coil 4, 14 in accordance with the detected direction of displacement, and controlling value of current application in accordance with the displace amount.

In the foregoing embodiment, direction of current applied to the coils 7, 14 can be switch by the arrangement having a single dc power source 20. Accordingly, though a pair of switch circuits and a pair of drive circuits are necessary, the drive circuits are formed by dividing a conventional drive circuit incorporating two output transistors for alternative operation into two parts, and there is no large difference in size of components or parts and space occupied. Concerning the switch circuits and switching circuit, they can be formed of relatively small number of parts. Accordingly, in the foregoing embodiment as a whole, capacity occupied by power source and battery can be reduced by half as compared with the construction of conventional control circuit. As a result, there is an advantage of greatly reducing manufacturing cost and achieving a small-sized magnetic bearing device.

Though displacement of the movable member 1 from the reference position is detected by the state detecting circuit 29 in the foregoing embodiment, it is also preferred that the current applied to the coils 7, 14 is controlled by detecting velocity or acceleration of movable member 1. It is also preferred to arrange the switch circuits 25, 27 to the wiring 23, 24 for first and second application of current and the drive circuit 26, 28 in the reverse order with the foregoing embodiment. It is also preferred that the direction signal in the displacement of the movable member 1 is inputted directly to the switching circuits 31 without passing through the control circuit 30. It is also preferred that the drive circuits 26, 28 are formed into a constant-current drive circuit for controlling the current passing through the coils 7, 14, and the FET, thyristor or the like is used as the output transistor.

What is claimed is:

1. A magnetic bearing device, comprising:

a magnetic movable member;

a first supporting member having a first coil and a permanent magnet;

a second supporting member having a second coil and a permanent magnet, a top end of the first coil being connected to a top end of the second coil, said first and second supporting members being located so as to position said movable member therebetween and wherein during operation said movable member is magnetically supported so as not to be in contact with either of said supporting members;

state detecting means for detecting a state of displacement of said movable member;

a first wiring for application of current, said first wiring having a first switch circuit connected to a first drive circuit, a bottom end of the first coil being connected between the first switch circuit and the first drive circuit;

a second wiring for application of current, said first and second wirings being connected in parallel to each other between a dc power source and ground, said second wiring having a second switch circuit connected to a second drive circuit, a bottom end of the second coil being connected between the second switch circuit and the second drive circuit; and switching means connected to said first and second wirings for switching direction of current applied to the first and second coils by switching to either a simultaneous closing state of said first switch circuit and said second drive circuit or a simultaneous closing state of said second switch circuit and said first drive circuit in accordance with the state detected by said state detecting means.

* * * * *